(12) United States Patent
Yoshida

(10) Patent No.: US 12,248,078 B2
(45) Date of Patent: Mar. 11, 2025

(54) SIGNAL RECEIVING EQUIPMENT, SIGNAL PROCESSING METHOD AND PROGRAM

(71) Applicant: Nippon Telegraph and Telephone Corporation, Tokyo (JP)

(72) Inventor: Seiji Yoshida, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 336 days.

(21) Appl. No.: 17/642,355

(22) PCT Filed: Aug. 26, 2020

(86) PCT No.: PCT/JP2020/032183
§ 371 (c)(1),
(2) Date: Mar. 11, 2022

(87) PCT Pub. No.: WO2021/054067
PCT Pub. Date: Mar. 25, 2021

(65) Prior Publication Data
US 2022/0326392 A1  Oct. 13, 2022

(30) Foreign Application Priority Data
Sep. 19, 2019  (WO) .................. PCT/JP2019/036796

(51) Int. Cl.
*G01S 19/30*  (2010.01)
*G01S 19/28*  (2010.01)
(Continued)

(52) U.S. Cl.
CPC .............. *G01S 19/30* (2013.01); *G01S 19/28* (2013.01); *G01S 19/29* (2013.01); *G01S 19/47* (2013.01)

(58) Field of Classification Search
CPC .......... G01S 19/28; G01S 19/29; G01S 19/30; G01S 19/43; G01S 19/47
See application file for complete search history.

(56) References Cited

U.S. PATENT DOCUMENTS

| 4,949,268 A * | 8/1990 | Nishikawa ............ G01S 19/426 701/472 |
| 2007/0018889 A1* | 1/2007 | Kurata .................... G01S 19/48 701/472 |

(Continued)

FOREIGN PATENT DOCUMENTS

| CN | 107579794 | 1/2018 |
| CN | 108089204 | 5/2018 |

(Continued)

OTHER PUBLICATIONS

Kubo, "A Study on GPS Multipath Mitigation and its Practicability for High Precise Positioning", doctoral thesis, Tokyo University of Marine Science and Technology, 2005, 656 pages (with English Translation).

*Primary Examiner* — Bernarr E Gregory
*Assistant Examiner* — Fred H Mull
(74) *Attorney, Agent, or Firm* — Fish & Richardson P.C.

(57) ABSTRACT

A signal receiving equipment includes a receiver configured to receive signals from a GNSS satellite, a memory, and a processor configured to select a plurality of signals from among the signals received by the receiver using a preset first parameter; perform at least positioning of a location by code-based positioning using the plurality of signals selected using the first parameter; select a plurality of signals from among the signals received by the receiver using a preset second parameter; and perform positioning of a location and time synchronization by carrier-phase-based positioning using the plurality of signals selected using the second parameter, with coordinates indicated by the location positioned by the code-based positioning as initial coordinates.

10 Claims, 7 Drawing Sheets

(51) Int. Cl.
*G01S 19/29* (2010.01)
*G01S 19/47* (2010.01)

(56) References Cited

U.S. PATENT DOCUMENTS

2009/0278738 A1* 11/2009 Gopinath .............. G01S 19/47
455/574
2022/0018968 A1* 1/2022 Tsumura .............. G01S 19/43

FOREIGN PATENT DOCUMENTS

| | | | |
|---|---|---|---|
| CN | 109581435 A * | 4/2019 | ............ G01S 19/30 |
| JP | 2016194417 A * | 11/2016 | |
| JP | 2017-058307 | 3/2017 | |
| JP | 2017219542 A * | 12/2017 | |
| JP | 2019-086392 | 6/2019 | |

* cited by examiner

SIGNAL RECEIVING EQUIPMENT, SIGNAL PROCESSING METHOD AND PROGRAM

CROSS-REFERENCE TO RELATED APPLICATIONS

This application is a National Stage application under 35 U.S.C. § 371 of International Application No. PCT/JP2020/032183, having an International Filing Date of Aug. 26, 2020, which claims priority to International Application No. PCT/JP2019/036796, filed on Sep. 19, 2019. The disclosure of the prior application is considered part of the disclosure of this application, and is incorporated in its entirety into this application.

TECHNICAL FIELD

The present invention relates to signal receiving equipment, a signal processing method, and a program.

BACKGROUND ART

Equipment is known which is capable of performing positioning of a location and time synchronization by receiving signals from global navigation satellite system (GNSS) satellites by radio waves. Additionally, positioning methods for a position include a code-based positioning method, a carrier-phase-based positioning (interference positioning) method, and the like, and it is known that positioning by a carrier-phase-based positioning method can be performed with higher accuracy than positioning by a code-based positioning method.

Incidentally, one of the factors that affect positioning accuracy and time synchronization accuracy is the number of GNSS satellites capable of transmitting signals that can be received as direct waves at a receiving position (hereinafter, such GNSS satellites are also referred to as "visible satellites"). In general, there may be a limitation in the number of visible satellites due to buildings and other structures, trees, and the like, and thus it is known to be effective to perform positioning and time synchronization in an environment where many signals from visible satellites can be received, to use a plurality of GNSSs together in a usage mode called a multi-GNSS, and the like in order to perform positioning and time synchronization with high accuracy.

In addition, another factor that affects positioning accuracy and time synchronization accuracy is the reception of multipath signals. A multipath signal is a signal propagated by reflected waves and diffracted waves generated due to the reflection and diffraction of radio waves received from a GNSS satellite by the surrounding structures, ground, and the like. A multipath signal may be accompanied by direct waves (that is, a multipath signal from a visible satellite) and may not be accompanied by direct waves (that is, a multipath signal from a GNSS satellite from which signals cannot be received as direct waves (hereinafter, such GNSS satellites are also referred to as a "non-visible satellite")).

Regarding a case where a multipath signal is accompanied by direct waves, a method of reducing the influence of a multipath signal by correlation signal processing in a GNSS satellite receiver in a normal case where the reception strength of direct waves is higher than the reception strength of a multipath signal has been proposed (see, for example, NPL 1).

On the other hand, regarding a case where a multipath signal is not accompanied by direct waves, it is difficult to eliminate the influence of a multipath signal except when a multipath signal received from an invisible satellite is not used for positioning, and thus it is known that an influence on positioning accuracy and time synchronization accuracy is significant. In response, various methods of selecting signals used for positioning and time synchronization have been proposed. Examples of known methods for selecting a signal to be used for positioning and time synchronization include a method by setting a threshold value for an elevation angle of a signal to be received, a signal reception strength, a signal-to-noise (SN) ratio, or the like.

CITATION LIST

Non Patent Literature

NPL 1: Nobuaki Kubo, "A Study on GPS Multipath Mitigation and its Practicability for High Precise Positioning", doctoral thesis, Tokyo University of Marine Science and Technology, 2005

SUMMARY OF THE INVENTION

Technical Problem

However, in a conventional method in which signals to be used for positioning and time synchronization are selected, it may not be possible to select signals that are appropriate signals for use in positioning or time synchronization. For example, signals from a visible satellite which are appropriate signals for use in positioning and time synchronization may not be selected, and many signals from an invisible satellite which are inappropriate signals may be selected. For this reason, the influence of a multipath signal may not be able to be sufficiently reduced, which may result in reductions in positioning accuracy and time synchronization accuracy. Furthermore, in a method of selecting signals used for positioning and time synchronization by setting a threshold value for an SN ratio and the like, reception characteristics of signals vary depending on an antenna and a GNSS satellite signal receiver, and thus an optimal threshold value varies. In addition, there has been a reliability problem such that the decreased number of satellite signals are selected when an interference signal is incorporated, which results in a risk of failing to perform positioning and time synchronization. In particular, there has been a problem of vulnerability to interference signals which are intentionally generated with respect to satellite signals, such as jamming.

An embodiment of the present invention has been made in view of the above-described circumstance, and an object thereof is to realize high positioning accuracy and time synchronization accuracy.

Means for Solving the Problem

In order to achieve the above-described object, a signal receiving equipment includes a reception unit configured to receive signals from a GNSS satellite, a first selection unit configured to select a plurality of signals from among the signals received by the reception unit using a preset first parameter, a first positioning unit configured to perform at least positioning of a location by code-based positioning using the plurality of signals selected by the first selection unit, a second selection unit configured to select a plurality of signals from among the signals received by the reception unit using a preset second parameter, and a second positioning unit configured to perform positioning of a location and time synchronization by carrier-phase-based positioning using the plurality of signals selected by the second selection unit, with coordinates indicated by the location positioned by the first positioning unit as initial coordinates.

Effects of the Invention

It is possible to realize high positioning accuracy and time synchronization accuracy.

DESCRIPTION OF EMBODIMENTS

Figure 1:
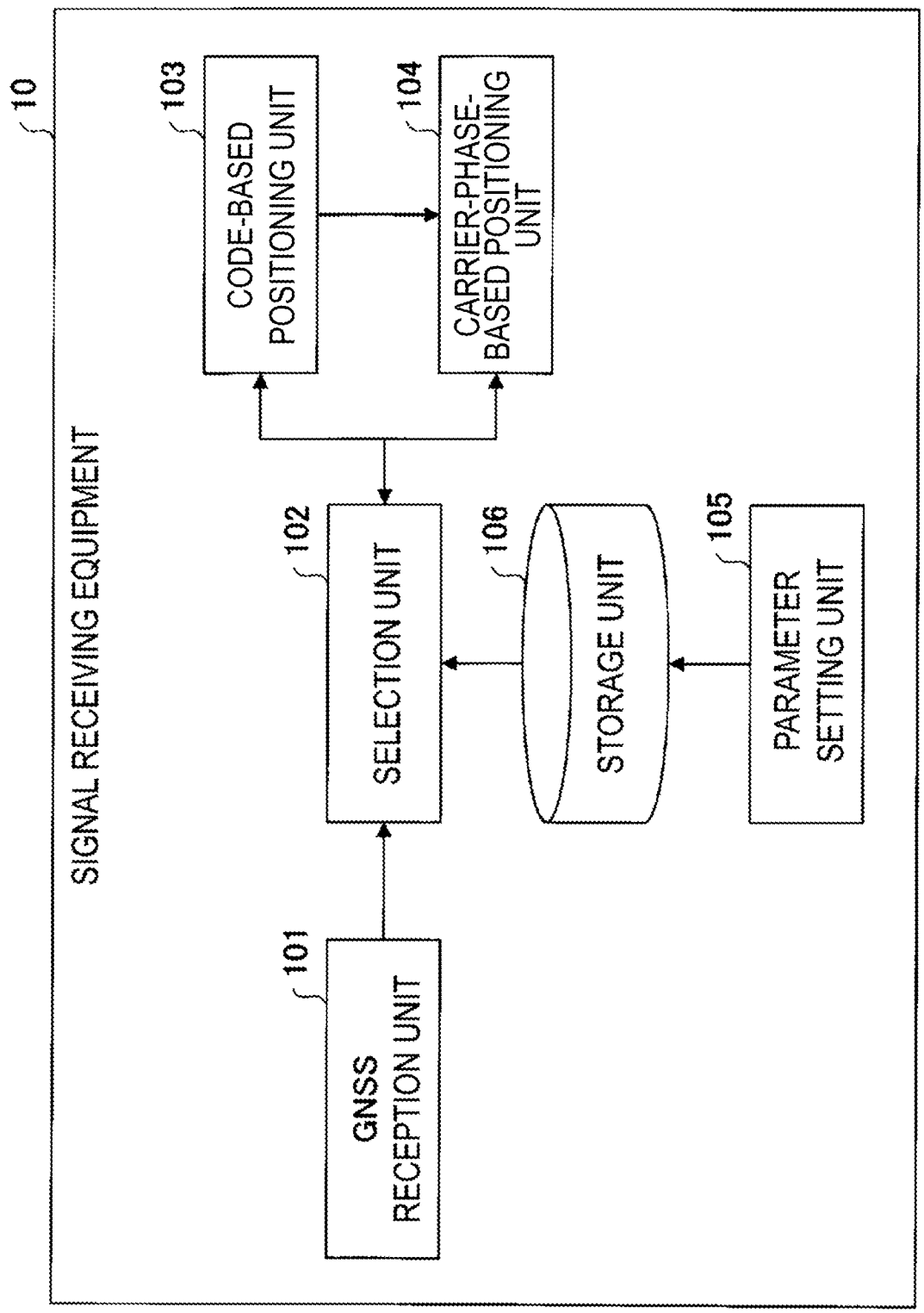
FIG. 1 is a diagram illustrating an example of a functional configuration of signal receiving equipment according to a first embodiment.

Hereinafter, embodiments of the present invention will be described. In the embodiments of the present invention, a signal receiving equipment 10 capable of realizing high positioning accuracy and time synchronization accuracy by appropriately selecting GNSS satellite signals used for positioning and time synchronization among signals received from GNSS satellites (hereinafter, also referred to as "GNSS satellite signals") will be described.

Note that, in the embodiments to be described below, it is assumed that GNSS satellite signals can be received from four or more GNSS satellites regardless of whether a GNSS satellite signal is a signal from a visible satellite or a signal from an invisible satellite in an environment in which structures that block propagation of GNSS satellite signals are present in the vicinity of the signal receiving equipment 10. In addition, it is assumed that the signal receiving equipment 10 having received a GNSS satellite signal cannot ascertain whether the GNSS satellite signal is a signal from a visible satellite or a signal from an invisible satellite.

Here, the signal receiving equipment 10 is any of various equipment, terminals, or the like capable of positioning of positional information and time synchronization by receiving GNSS satellite signals at predetermined time intervals (for example, every second) via radio waves. At this time, the signal receiving equipment 10 can perform positioning of positional information and time synchronization with high accuracy by selecting GNSS satellite signals used for positioning and time synchronization according to a predetermined procedure, and performing positioning by carrier-phase-based positioning using positioning results of code-based positioning as initial coordinates.

Note that any equipment, device, or the like capable of receiving GNSS satellite signals by radio waves can be used as the signal receiving equipment 10. Specific examples of the signal receiving equipment 10 include a GNSS tracker or a GNSS logger which is mounted on or carried by a mobile object such as a vehicle or a person (a smartphone or a tablet terminal in which an application program for realizing the function of the GNSS tracker or the GNSS logger is installed, an in-vehicle device, a wearable device, a portable game machine, and the like are also included), a signal receiving equipment or a signal receiving device which is fixedly installed in a structure such as a construction machine or a bridge, and the like.

The signal receiving equipment 10 is mounted on or carried by any mobile object (for example, a vehicle, a person, or the like). For example, the signal receiving equipment 10 may be mounted on or taken into a vehicle or may be carried or held by a pedestrian. Furthermore, the signal receiving equipment 10 may transmit positioning results of positional information, time synchronization results, and the like to a predetermined server or the like at predetermined time intervals (for example, every second to every several tens of seconds).

First Embodiment

Hereinafter, a first embodiment will be described.

Functional Configuration

First, a functional configuration of the signal receiving equipment 10 according to the present embodiment will be described with reference to FIG. 1. FIG. 1 is a diagram illustrating an example of a functional configuration of the signal receiving equipment 10 according to the first embodiment.

As illustrated in FIG. 1, the signal receiving equipment 10 according to the present embodiment includes a GNSS reception unit 101, a selection unit 102, a code-based positioning unit 103, a carrier-phase-based positioning unit 104, and a parameter setting unit 105. In addition, the signal receiving equipment 10 according to the present embodiment includes a storage unit 106.

The GNSS reception unit 101 receives GNSS satellite signals at predetermined time intervals (for example, every second). Here, in the present embodiment, it is assumed that the GNSS reception unit 101 receives GNSS satellite signals from at least four GNSS satellites, as described above. This is because it is necessary to specify four of three-dimensional positional information (x, y, z) and time information t (more accurately, a time difference Δt between a clock mounted on a GNSS satellite and a clock mounted on the signal receiving equipment 10) in order to perform positioning of positional information and time synchronization.

The selection unit 102 uses a first parameter stored in the storage unit 106 to select GNSS satellite signals to be used for code-based positioning for acquiring initial coordinates that are used for carrier-phase-based positioning, and uses a second parameter stored in the storage unit 106 to select GNSS satellite signals to be used for carrier-phase-based positioning. At this time, according to the first parameter, the selection unit 102 repeats the selection of GNSS satellite signals and the code-based positioning using the selected GNSS satellite signals to select GNSS satellite signals to be used for code-based positioning for obtaining initial coordinates that are used for carrier-phase-based positioning. Similarly, according to the second parameter, the selection unit 102 repeating the selection of GNSS satellite signals and the code-based positioning using the selected GNSS satellite signals to select GNSS satellite signals to be used for carrier-phase-based positioning.

Here, the first parameter is a parameter for selecting GNSS satellite signals to be used for code-based positioning, and the second parameter is a parameter for selecting GNSS satellite signals to be used for carrier-phase-based positioning. These parameters include, for example, a threshold value of a carrier-to-noise (CN) ratio (hereinafter, also referred to as a "CN ratio threshold value"), which is one of indexes of an SN ratio, an allowable error from an earliest time at which a GNSS satellite signal reaches certain coordinates, and the like.

The code-based positioning unit 103 performs code-based positioning using the GNSS satellite signals selected by the selection unit 102. In other words, the code-based positioning unit 103 performs code-based positioning for selecting GNSS satellite signals and code-based positioning for obtaining initial coordinates used for carrier-phase-based positioning. Note that a positioning result of the code-based positioning for obtaining initial coordinates to be used for carrier-phase-based positioning is output to the carrier-phase-based positioning unit 104.

The carrier-phase-based positioning unit 104 performs carrier-phase-based positioning using the GNSS satellite signals selected by the selection unit 102, with the positioning result obtained from the code-based positioning unit 103 as initial coordinates. Thereby, positioning of positional information and time synchronization based on coordinate values of the positioning result are performed. Note that, in carrier-phase-based positioning, positioning of positional information and time synchronization based on coordinate values of the positioning result are performed by solving wave number ambiguity and obtaining a fix solution.

Note that the time synchronization may be synchronization with the coordinated universal time (UTC) or may be synchronization with any of other standard times (for example, Japan standard time (JST)).

The parameter setting unit 105 sets the first parameter and the second parameter in accordance with, for example, a user's operation or the like. The first parameter and the second parameter that are set by the parameter setting unit 105 are stored in the storage unit 106. Note that the setting of the first parameter and the second parameter may be performed by a user operating the signal receiving equipment 10, or may be performed by a user operating a terminal connected to the signal receiving equipment 10 via a communication network, a USB cable, or the like.

Hardware Configuration

Figure 2:
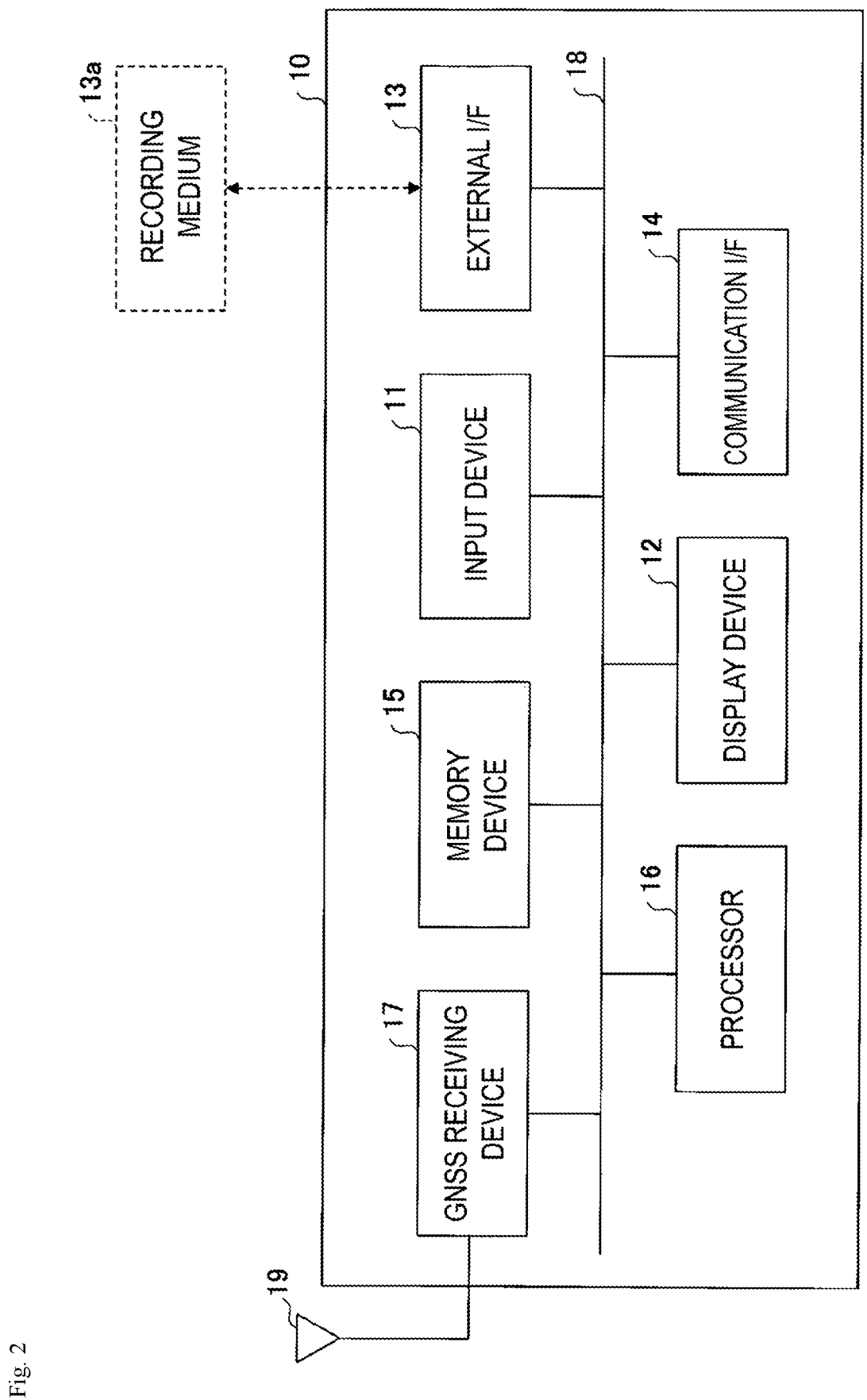
FIG. 2 is a diagram illustrating an example of a hardware configuration of the signal receiving equipment according to the first embodiment.

Next, a hardware configuration of the signal receiving equipment 10 according to the present embodiment will be described with reference to FIG. 2. FIG. 2 is a diagram illustrating an example of a hardware configuration of the signal receiving equipment 10 according to the first embodiment.

As illustrated in FIG. 2, the signal receiving equipment 10 according to the present embodiment includes an input device 11, a display device 12, an external I/F 13, a communication I/F 14, a memory device 15, a processor 16, and a GNSS receiving device 17. These pieces of hardware are communicatively connected to each other via a bus 18.

The input device 11 is, for example, a touch panel, various operation buttons, or the like. The display device 12 is, for example, a display or the like. Note that the signal receiving equipment 10 may not include at least one of the input device 11 and the display device 12.

The external I/F 13 is an interface for connection to an external device such as a recording medium 13a. Examples of the recording medium 13a include an SD memory card, a USB memory, and the like.

The communication I/F 14 is an interface for connecting the signal receiving equipment 10 to a communication network.

The memory device 15 is any of various storage devices such as a random access memory (RAM), a read-only memory (ROM), and a flash memory. The storage unit 106 can be implemented by using, for example, the memory device 15.

The processor 16 is any of various computation devices such as a central processing unit (CPU) or a microprocessing unit (MPU). The GNSS reception unit 101, the selection unit 102, the code-based positioning unit 103, the carrier-phase-based positioning unit 104, and the parameter setting unit 105 are implemented, for example, by one or more programs, stored in the memory device 15, which causes the processor 16 to execute processing.

The GNSS receiving device 17, which is also referred to as a GNSS receiver, is a device or a module that receives signals from a GNSS satellite by radio waves by a GNSS antenna 19 connected thereto via a coaxial cable or the like to perform positioning of positional information, time synchronization, and the like.

The signal receiving equipment 10 according to the present embodiment has the hardware configuration illustrated in FIG. 2 and thus can implement various processing to be described later. Note that the hardware configuration illustrated in FIG. 2 is an example, and the signal receiving equipment 10 according to the present embodiment may have other hardware configurations. For example, the signal receiving equipment 10 according to the present embodiment may include a plurality of memory devices 15, or may include a plurality of processors 16. In addition, some hardware configurations may also be connected to each other via a communication network. In this case, some of the functional units described in FIG. 1 may be realized via a communication network.

Flow of Processing

Figure 3:
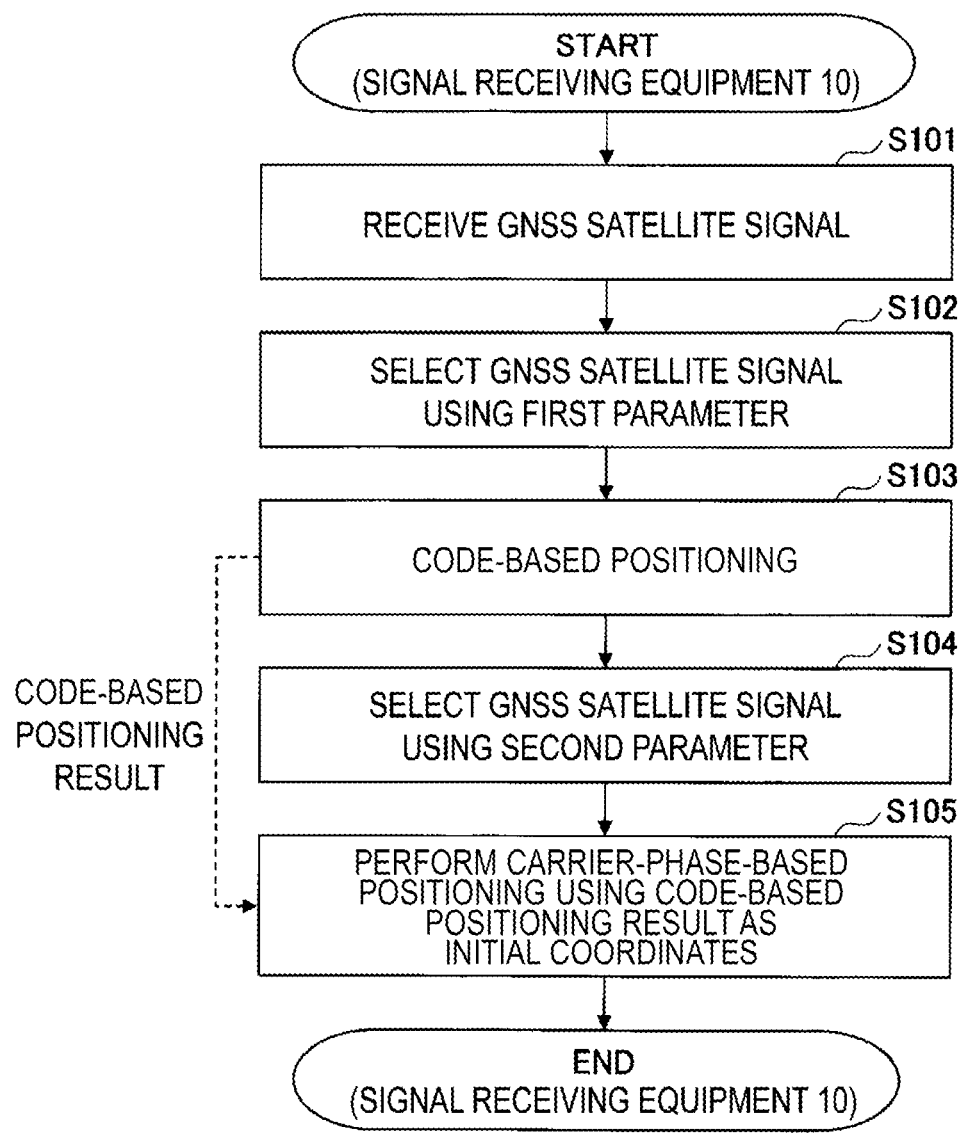
FIG. 3 is a diagram illustrating a flow of an example of positioning and time synchronization processing according to the first embodiment.

Next, a flow of processing for performing positioning of positional information and time synchronization in the signal receiving equipment 10 according to the present embodiment (positioning and time synchronization processing) will be described with reference to FIG. 3. FIG. 3 is a diagram illustrating a flow of an example of positioning and time synchronization processing according to the first embodiment.

The GNSS reception unit 101 of the signal receiving equipment 10 receives GNSS satellite signals from at least four GNSS satellites at predetermined time intervals (for example, every second) (step S101). Hereinafter, let N be the number of GNSS satellite signals received by the GNSS reception unit 101.

Next, the signal receiving equipment 10 selects GNSS satellite signals to be used for code-based positioning (that is, code-based positioning in step S103 to be described later) for obtaining initial coordinates used for carrier-phase-based positioning from among the GNSS satellite signals received in step S101 described above, using the first parameter stored in the storage unit 106 (step S102). Note that, as described above, the first parameter is set in advance by the parameter setting unit 105 and is stored in the storage unit 106.

Here, in step S102, the signal receiving equipment 10 selects GNSS satellite signals by the following Steps 11 to 12 and Steps 21 to 26.

Step 11) The selection unit 102 selects GNSS satellite signals having a CN ratio exceeding a first CN ratio threshold value included in the first parameter, from among the N GNSS satellite signals. At this time, in a case where the number of GNSS satellites corresponding to the selected GNSS satellite signals (that is, the GNSS satellites transmitting the selected GNSS satellite signals) is less than $n_1$ (where $n_1$ is a preset integer of 4 or greater), the selection unit 102 selects GNSS satellite signals in descending order of the CN ratio from among GNSS satellite signals having respective CN ratios less than or equal to the first CN ratio threshold value, and performs setting such that the number of GNSS satellites is $n_1$ in total. Note that an SN ratio and a threshold value thereof may be used instead of the CN ratio and the first CN ratio threshold value.

Step 12) Next, the code-based positioning unit 103 performs code-based positioning using the $n_1$ GNSS satellite signals selected in Step 11 described above. Hereinafter, coordinates indicated by a positioning result of the code-based positioning are also referred to as "first reference coordinates".

Step 21) The selection unit 102 calculates an arrival time at which each of the N GNSS satellite signals reaches the first reference coordinates by using the position of a GNSS satellite corresponding to each of the N GNSS satellite signals and a time at which each of the N GNSS satellite signals is transmitted. Note that the position of the GNSS satellite can be specified from orbit information of the GNSS satellite (for example, an almanac, an ephemeris, and the like).

Step 22) Next, the selection unit 102 determines an earliest time among the arrival times calculated in Step 21 described above. Hereinafter, the determined time will be denoted by $T_{01}$.

Step 23) Next, the selection unit 102 sets $T_{01}+dT_{11}$ as a first reference time by using an allowable error $dT_{11}$ included in the first parameter.

Step 24) Next, the selection unit 102 selects GNSS satellite signals whose arrival time calculated in Step 21 described above is earlier than the first reference time $T_{01}+dT_{11}$.

Step 25) In a case where the number of GNSS satellites corresponding to the respective GNSS satellite signals selected in Step 24 described above is four or more, the code-based positioning unit 103 performs code-based positioning using the GNSS satellite signals selected in Step 24 described above to update the first reference coordinates with a positioning result of the code-based positioning.

Step 26) Next, the selection unit 102 determines whether or not a first termination condition included in the first parameter has been satisfied. Then, in a case where it is determined that the first termination condition has not been satisfied, the selection unit 102 returns to Step 21 described above. Thereby, Steps 21 to 26 described above are repeatedly executed until the first termination condition is satisfied.

On the other hand, in a case where it is determined that the first termination condition has been satisfied, the selection unit 102 sets the GNSS satellite signals which are finally selected in Step 24 as GNSS satellite signals to be used for code-based positioning in step 5103, which is described later. Thereby, GNSS satellite signals to be used for the code-based positioning for obtaining initial coordinates that is used for carrier-phase-based positioning is selected.

Examples of the first termination condition included in the first parameter include "a predetermined period of time has elapsed since Step 21 has been executed first". Thereby, Steps 21 to 26 are repeatedly executed until a predetermined period of time elapses since Step 21 has been executed first. Examples of the first termination condition include "the number of repetitions of Steps 21 to 26 has reached a predetermined number of times" or the like, or "a GNSS satellite corresponding to each of the GNSS satellite signals selected in Step 24 has not changed from the GNSS satellite corresponding to each of the GNSS satellite signals selected in Step 24 in the previous repetition" or the like.

Next, the code-based positioning unit 103 of the signal receiving equipment 10 performs code-based positioning using the GNSS satellite signals selected in step S102 described above (that is, the GNSS satellite signals which are finally selected in Step 24) (step S103). A positioning result of the code-based positioning is output to the carrier-phase-based positioning unit 104.

Next, the signal receiving equipment 10 selects GNSS satellite signals to be used for carrier-phase-based positioning from among the N GNSS satellite signals received in step S101 described above by using the second parameter stored in the storage unit 106 (step S104). Note that, as described above, the second parameter is set in advance by the parameter setting unit 105 and is stored in the storage unit 106.

Here, in step S104, the signal receiving equipment 10 selects GNSS satellite signals by the following Steps 31 to 32 and Steps 41 to 46.

Step 31) The selection unit 102 selects GNSS satellite signals having a CN ratio exceeding a second CN ratio threshold value included in the second parameter, from among the N GNSS satellite signals. At this time, in a case where the number of GNSS satellites corresponding to the selected GNSS satellite signals is less than $n_2$ (where $n_2$ is a preset integer of 4 or greater), the selection unit 102 selects GNSS satellite signals in descending order of a CN ratio from among GNSS satellite signals having respective CN ratios less than or equal to the second CN ratio threshold value, and performs setting such that the number of GNSS satellites is $n_2$. Note that an SN ratio and a threshold value thereof may be used instead of the CN ratio and the second CN ratio threshold value.

Step 32) Next, the code-based positioning unit 103 performs code-based positioning using the GNSS satellite signals selected in Step 31 described above. Hereinafter, coordinates indicated by a positioning result of the code-based positioning are also referred to as "second reference coordinates".

Step 41) The selection unit 102 calculates an arrival time at which each of the N GNSS satellite signals reaches the second reference coordinates by using the position of a GNSS satellite corresponding to each of the N GNSS satellite signals and a time at which each of the N GNSS satellite signals is transmitted.

Step 42) Next, the selection unit 102 determines an earliest time among the arrival times calculated in Step 41 described above. Hereinafter, the determined time will be denoted by $T_{02}$.

Step 43) Next, the selection unit 102 sets $T_{02}+dT_{12}$ as a second reference time by using an allowable error $dT_{12}$ included in the second parameter.

Step 44) Next, the selection unit 102 selects GNSS satellite signals whose arrival time calculated in Step 41 described above is earlier than the second reference time $T_{02}+dT_{12}$.

Step 45) In a case where the number of GNSS satellites corresponding to the respective GNSS satellite signals selected in Step 44 described above is four or more, the code-based positioning unit 103 performs code-based positioning using the GNSS satellite signals selected in Step 44 described above to update the second reference coordinates using a positioning result of the code-based positioning.

Step 46) Next, the selection unit 102 determines whether or not a second termination condition included in the second parameter is satisfied. Then, in a case where it is determined that the second termination condition has not been satisfied, the selection unit 102 returns to Step 41 described above. Thereby, Steps 41 to 46 described above are repeatedly executed until the second termination condition is satisfied.

On the other hand, in a case where it is determined that the second termination condition has been satisfied, the selection unit 102 sets the GNSS satellite signals which are finally selected in Step 44 as GNSS satellite signals to be used for carrier-phase-based positioning in step S105, which is described later. Thereby, GNSS satellite signals to be used for the carrier-phase-based positioning is selected.

Examples of the second termination condition included in the second parameter include "a predetermined period of time has elapsed since Step 41 has been executed first". Thereby, Steps 41 to 46 are repeatedly executed until a predetermined period of time has elapsed since Step 41 has been executed first. Examples of the second termination condition include "the number of repetitions of Steps 41 to 46 has reached a predetermined number of times" or the like, or "a GNSS satellite corresponding to each of the GNSS satellite signals selected in Step 44 has not changed from the GNSS satellite corresponding to each of the GNSS satellite signals selected in Step 44 in the previous repetition" or the like.

Then, the carrier-phase-based positioning unit 104 of the signal receiving equipment 10 performs carrier-phase-based positioning using the GNSS satellite signals selected in step 5104 described above (that is, the GNSS satellite signals selected which are finally selected in Step 44) using the positioning result output from the code-based positioning unit 103 as initial coordinates (step S105). Thereby, positioning of positional information and time synchronization are performed.

Another Example of Steps 21 to 26 (Part 1)

Here, the following Steps 21' to 27' may be executed instead of Steps 21 to 26 described above.

Step 21') The selection unit 102 calculates an arrival time at which each of the N GNSS satellite signals reaches the first reference coordinates by using the position of a GNSS satellite corresponding to each of the N GNSS satellite signals and a time at which each of the N GNSS satellite signals is transmitted.

Step 22') Next, the selection unit 102 calculates an average value of the arrival times calculated in Step 21' described above for each of $_NC_M$ combinations of M GNSS satellite signals (where N>M) from among the N GNSS satellite signals.

Step 23') Next, the selection unit 102 determines an earliest time among the average values calculated in Step 22' described above. Hereinafter, the determined time will be denoted by $T_{01}$.

Step 24') Next, the selection unit 102 sets $T_{01}+dT_{21}$ as a first reference time by using an allowable error $dT_{21}$ included in the first parameter.

Step 25') Next, the selection unit 102 selects GNSS satellite signals whose arrival time calculated in Step 21' described above is earlier than the first reference time $T_{01}+dT_{21}$.

Step 26') In a case where the number of GNSS satellites corresponding to the respective GNSS satellite signals selected in Step 25' described above is four or more, the code-based positioning unit 103 performs code-based positioning using the GNSS satellite signals selected in Step 25' described above to update the first reference coordinates with a positioning result of the code-based positioning.

Step 27') Next, the selection unit 102 determines whether or not the first termination condition included in the first parameter has been satisfied. Then, in a case where it is determined that the first termination condition has not been satisfied, the selection unit 102 returns to Step 21' described above. Thereby, Steps 21' to 27' described above are repeatedly executed until the first termination condition is satisfied.

On the other hand, in a case where it is determined that the first termination condition has been satisfied, the GNSS satellite signals which are finally selected in Step 25' is set to be GNSS satellite signals to be used for the code-based positioning in step 5103.

Examples of the first termination condition included in the first parameter include "a predetermined period of time has elapsed since Step 21' has been executed first", "the number of repetitions of Steps 21' to 27' has reached a predetermined number of times", "a GNSS satellite corresponding to each of the GNSS satellite signals selected in Step 25' has not changed from the GNSS satellite corresponding to each of the GNSS satellite signals selected in Step 25' in the previous repetition", or the like.

Another Example of Steps 21 to 26 (Part 2)

In addition, the following Steps 21" to 27" may be executed instead of Steps 21 to 26 described above.

Step 21") The selection unit 102 calculates an arrival time at which each of the N GNSS satellite signals reaches the first reference coordinates by using the position of a GNSS satellite corresponding to each of the N GNSS satellite signals and a time at which each of the N GNSS satellite signals is transmitted.

Step 22") Next, the selection unit 102 calculates an average value of the arrival times calculated in Step 21" described above for each of $_NC_M$ combinations of M GNSS satellite signals (here, N>M, and M is 4 or greater) from among the N GNSS satellite signals.

Step 23") Next, the selection unit 102 determines an earliest time among the average values calculated in Step 22" described above. Hereinafter, the determined time will be denoted by $T_{01}$.

Step 24") Next, the selection unit 102 sets $T_{01}+dT_{31}$ as a first reference time by using an allowable error $dT_{31}$ included in the first parameter.

Step 25") Next, the selection unit 102 selects GNSS satellite signals included in a combination corresponding to an average value which is earlier than the first reference time $T_{01}+dT_{31}$ among the average values calculated in Step 22" described above.

Step 26") The code-based positioning unit 103 performs code-based positioning using the GNSS satellite signals selected in Step 25" described above to update the first reference coordinates with a positioning result of the code-based positioning.

Step 27") Next, the selection unit 102 determines whether or not the first termination condition included in the first parameter has been satisfied. Then, in a case where it is determined that the first termination condition has not been satisfied, the selection unit 102 returns to Step 21" described above. Thereby, Steps 21" to 27" described above are repeatedly executed until the first termination condition is satisfied.

On the other hand, in a case where it is determined that the first termination condition has been satisfied, the selection unit 102 sets the GNSS satellite signals which are finally selected in Step 25" as GNSS satellite signals to be used for the code-based positioning in step S103.

Examples of the first termination condition included in the first parameter include "a predetermined period of time has elapsed since Step 21" has been executed first", a condition indicating that "the number of repetitions of Steps 21" to 27" has reached a predetermined number of times", a condition indicating that "a GNSS satellite corresponding to each of the GNSS satellite signals selected in Step 25" has not changed from the GNSS satellite corresponding to each of the GNSS satellite signals selected in Step 25" in the previous repetition", or the like.

Another Example of Steps 41 to 46 (Part 1)

Here, the following Steps 41' to 47' may be executed instead of Steps 41 to 46 described above.

Step 41') The selection unit 102 calculates an arrival time at which each of the N GNSS satellite signals reaches the second reference coordinates by using the position of a GNSS satellite corresponding to each of the N GNSS satellite signals and a time at which each of the N GNSS satellite signals is transmitted.

Step 42') Next, the selection unit 102 calculates an average value of the arrival times calculated in Step 41' described above for each of $_NC_M$ combinations of M GNSS satellite signals (where N>M) from among the N GNSS satellite signals.

Step 43') Next, the selection unit 102 determines an earliest time among the average values calculated in Step 42' described above. Hereinafter, the determined time will be denoted by $T_{02}$.

Step 44') Next, the selection unit 102 sets $T_{02}+dT_{22}$ as a second reference time by using an allowable error $dT_{22}$ included in the second parameter.

Step 45') Next, the selection unit 102 selects GNSS satellite signals whose arrival time calculated in Step 41' described above is earlier than the second reference time $T_{02}+dT_{22}$.

Step 46') In a case where the number of GNSS satellites corresponding to the respective GNSS satellite signals selected in Step 45' described above is four or more, the code-based positioning unit 103 performs code-based positioning using the GNSS satellite signals selected in Step 45' described above to update the second reference coordinates with a positioning result of the code-based positioning.

Step 47') Next, the selection unit 102 determines whether or not the second termination condition included in the second parameter has been satisfied. Then, in a case where it is determined that the second termination condition has not been satisfied, the selection unit 102 returns to Step 41' described above. Thereby, Steps 41' to 47' described above are repeatedly executed until the second termination condition is satisfied.

On the other hand, in a case where it is determined that the second termination condition has been satisfied, the selection unit 102 sets the GNSS satellite signals which are finally selected in Step 45' as GNSS satellite signals to be used for the carrier-phase-based positioning in step S105.

Examples of the second termination condition included in the second parameter include "a predetermined period of time has elapsed since Step 41' has been executed first", "the number of repetitions of Steps 41' to 47' has reached a predetermined number of times", "a GNSS satellite corresponding to each of the GNSS satellite signals selected in Step 45' has not changed from the GNSS satellite corresponding to each of the GNSS satellite signals selected in Step 45' in the previous repetition", or the like.

Another Example of Steps 41 to 46 (Part 2)

In addition, the following Steps 41" to 47" may be executed instead of Steps 41 to 46 described above.

Step 41") The selection unit 102 calculates an arrival time at which each of the N GNSS satellite signals reaches the second reference coordinates by using the position of a GNSS satellite corresponding to each of the N GNSS satellite signals and a time at which each of the N GNSS satellite signals is transmitted.

Step 42") Next, the selection unit 102 calculates an average value of the arrival times calculated in Step 41" described above for each of $_NC_M$ combinations of M GNSS satellite signals (where N>M, and M is 4 or greater) from among the N GNSS satellite signals.

Step 43") Next, the selection unit 102 determines an earliest time among the average values calculated in Step 42" described above. Hereinafter, the determined time will be denoted by $T_{02}$.

Step 44") Next, the selection unit 102 sets $T_{02}+dT_{32}$ as a second reference time by using an allowable error $dT_{32}$ included in the second parameter.

Step 45") Next, the selection unit 102 selects GNSS satellite signals included in a combination corresponding to an average value which is earlier than the second reference time $T_{02}+dT_{32}$ among the average values calculated in Step 42" described above.

Step 46") The code-based positioning unit 103 performs code-based positioning using the GNSS satellite signals selected in Step 45" described above to update the second reference coordinates with a positioning result of the code-based positioning.

Step 47") Next, the selection unit 102 determines whether or not the second termination condition included in the second parameter has been satisfied. Then, in a case where it is determined that the second termination condition has not been satisfied, the selection unit 102 returns to Step 41" described above. Thereby, Steps 41" to 47" described above are repeatedly executed until the second termination condition is satisfied.

On the other hand, in a case where it is determined that the second termination condition has been satisfied, the selection unit 102 sets the GNSS satellite signals which are finally selected in Step 45" as GNSS satellite signals to be used for the carrier-phase-based positioning in step S105.

Examples of the second termination condition included in the second parameter include "a predetermined period of time has elapsed since Step 41" has been executed first", "the number of repetitions of Steps 41" to 47" has reached a predetermined number of times", "a GNSS satellite corresponding to each of the GNSS satellite signals selected in Step 45" has not changed from the GNSS satellite corresponding to each of the GNSS satellite signals selected in Step 45" in the previous repetition", or the like.

Note that optimal values of the allowable errors ($dT_{11}$, $dT_{12}$, $dT_{21}$, $dT_{22}$, $dT_{31}$, $dT_{32}$) used when GNSS satellite signals are selected in the above-described positioning and time synchronization processing vary depending on a reception state of the GNSS satellite signals, and thus it is preferable that the allowable errors be determined according to a reception environment for the GNSS satellite signals.

Specifically, it is preferable that an allowable error be set larger as a reception environment for GNSS satellite signals is close to an open sky environment (that is, an environment with no or few shields such as structures and trees), and an allowable error be set smaller as a reception environment for GNSS satellite signals is close to a multipath environment (that is, an environment where multipath signals are generated due to structures, trees, and the like). In other words, it is preferable that an allowable error be set larger as the number of visible satellites is large, and an allowable error be set smaller as the number of visible satellites is small.

In addition, a GNSS satellite signal having an extremely small elevation angle tends to cause a large error in a pseudo distance, that is, an arrival time of the GNSS satellite signal. Thus, a threshold value may be set for the elevation angle of a GNSS satellite signal, and a GNSS satellite signal having an elevation angle less than or equal to the threshold value may be excluded from a GNSS satellite signal to be a target for computation of satellite selection (that is, processing for selecting GNSS satellite signals in step S102 and step S104).

Another Example of Positioning and Time Synchronization Processing

Figure 4:
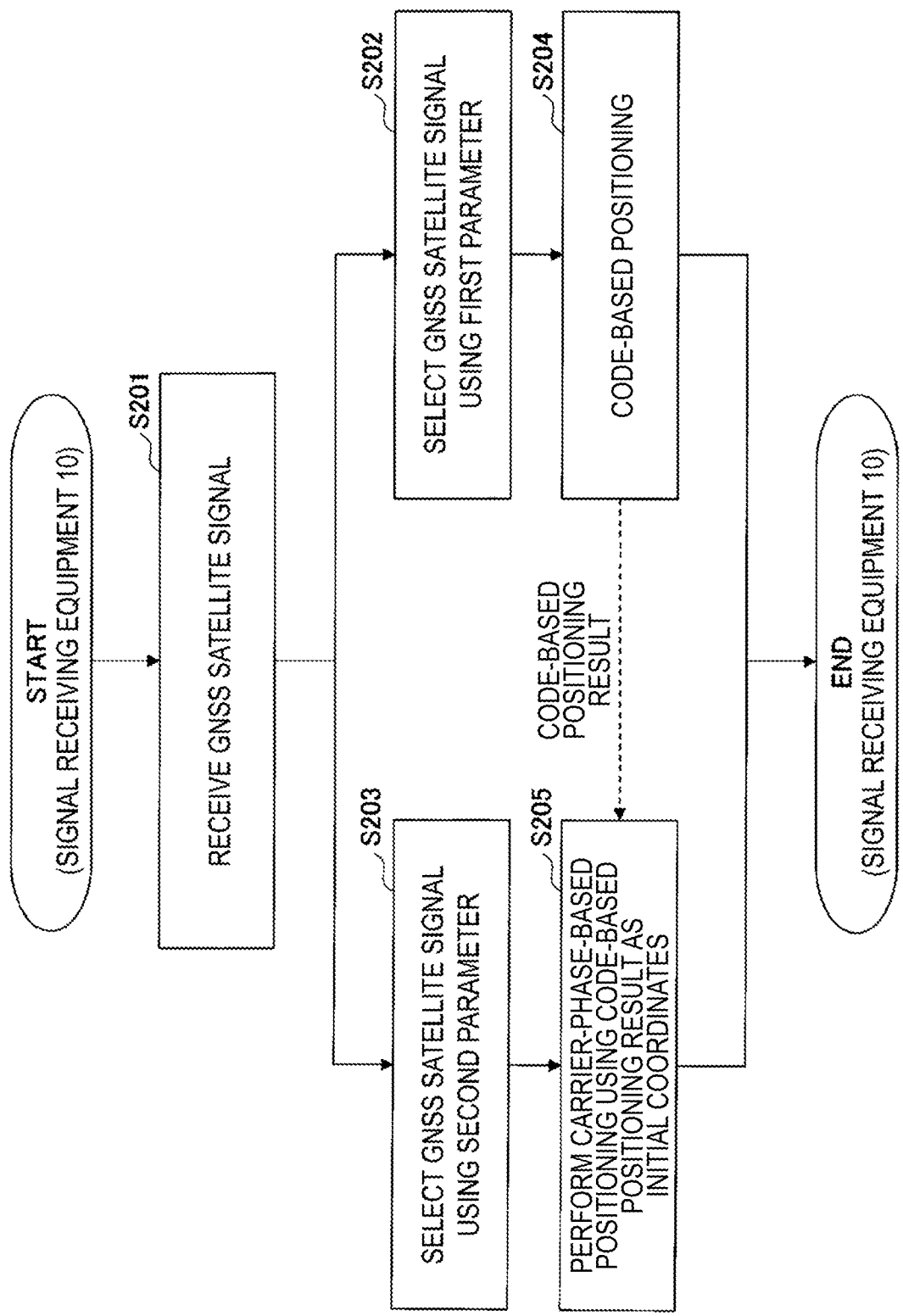
FIG. 4 is a diagram illustrating a flow of another example of positioning and time synchronization processing according to the first embodiment.

Here, in the above-described positioning and time synchronization processing illustrated in FIG. 3, step S102 and step S104 are performed in series, but these processes may be executed in parallel. Consequently, positioning and time synchronization processing in which these processes are executed in parallel will be described with reference to FIG. 4. FIG. 4 is a diagram illustrating a flow of another example of the positioning and time synchronization processing according to the first embodiment.

Similar to step S101 in FIG. 3, the GNSS reception unit 101 of the signal receiving equipment 10 receives N GNSS satellite signals at predetermined time intervals (step S201).

Next, similarly to step S102 in FIG. 3, the signal receiving equipment 10 selects GNSS satellite signals to be used for code-based positioning for obtaining initial coordinates used for carrier-phase-based positioning from among the GNSS satellite signals received in step S201 described above by using the first parameter stored in the storage unit 106 (step S202).

In addition, similarly to step S104 in FIG. 3, the signal receiving equipment 10 selects GNSS satellite signals to be used for carrier-phase-based positioning from among the N GNSS satellite signals received in step S201 described above by using the second parameter stored in the storage unit 106 (step S203).

Note that the signal receiving equipment 10 executes steps S202 and S203 described above in parallel.

Subsequently to step S202 described above, the code-based positioning unit 103 of the signal receiving equipment 10 performs code-based positioning using the GNSS satellite signals selected in step S202 (step S204). A positioning result of the code-based positioning is output to the carrier-phase-based positioning unit 104.

Subsequently to step S203 described above, the carrier-phase-based positioning unit 104 of the signal receiving equipment 10 performs carrier-phase-based positioning using the GNSS satellite signals selected in step S203 with the positioning result output from the code-based positioning unit 103 as initial coordinates, similar to step S105 in FIG. 3 (step S205). Thereby, positioning of positional information and time synchronization are performed.

Note that in the positioning and time synchronization processing illustrated in FIG. 4, for example, positional information and time information obtained from positioning of the code-based positioning in step S204 described above may be output first, and then positional information and time information obtained from positioning of the carrier-phase-based positioning in step S205 described above may be output in a case where a fix solution is obtained by the carrier-phase-based positioning. Alternatively, for example, in a case where a fix solution is not obtained by the carrier-phase-based positioning in step S205 described above, positional information and time information obtained from positioning of the code-based positioning in step S204 described above may be output.

Second Embodiment

Hereinafter, a second embodiment will be described. In the second embodiment, description will be given of a case where a server apparatus 20 manages a plurality of first parameters and a plurality of second parameters, and a signal receiving equipment 10 acquires an optimal first parameter and an optimal second parameter from the server apparatus 20 and selects GNSS satellite signals. Note that, in the second embodiment, differences from the first embodiment will be mainly described, components similar to those in the first embodiment will be denoted by the same reference numerals and signs, and the description thereof will be omitted.

Functional Configuration

Figure 5:
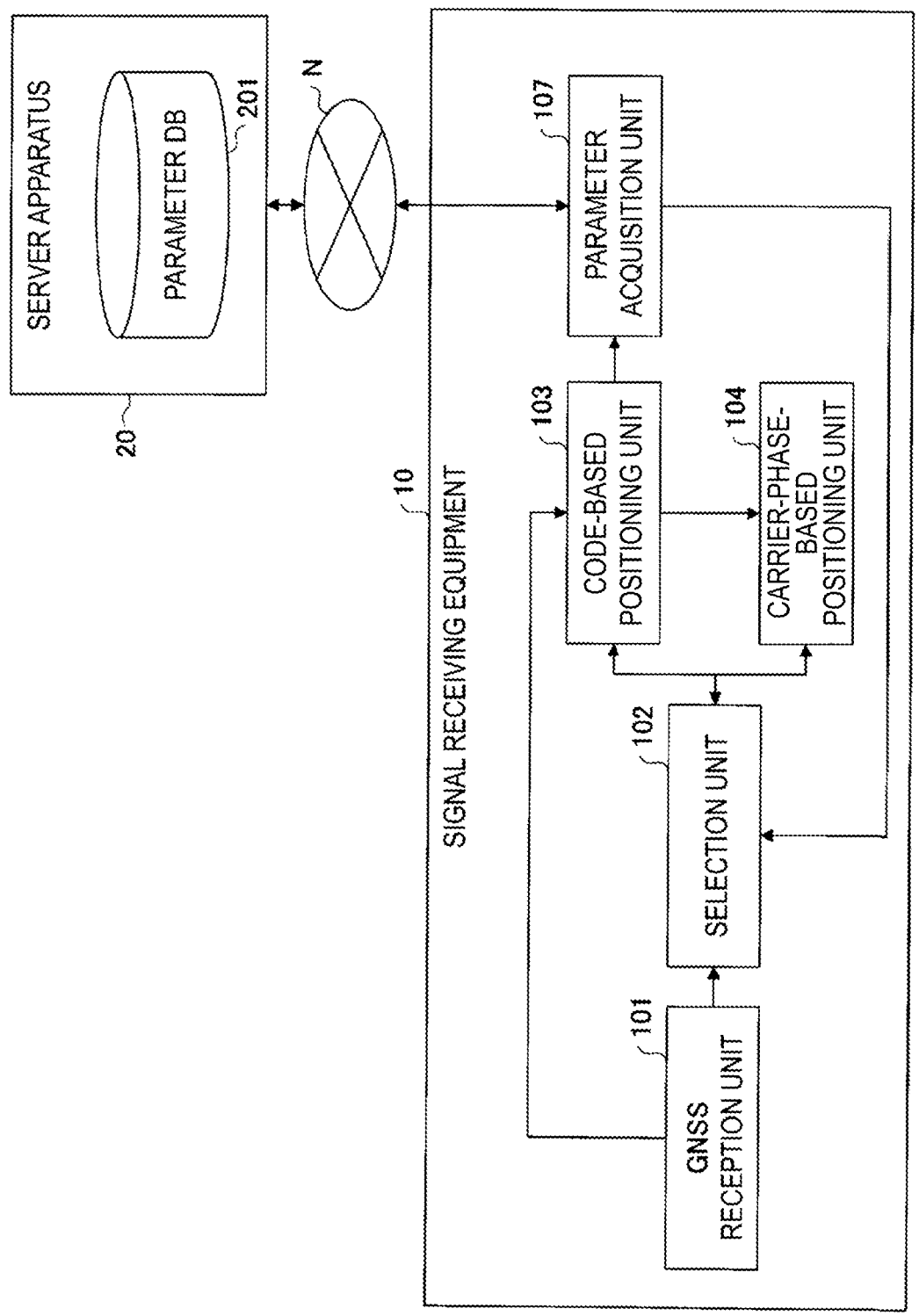
FIG. 5 is a diagram illustrating an example of a functional configuration of the signal receiving equipment according to a second embodiment.

First, a functional configuration of the signal receiving equipment 10 according to the present embodiment will be described with reference to FIG. 5. FIG. 5 is a diagram illustrating an example of a functional configuration of the signal receiving equipment 10 according to the second embodiment.

As illustrated in FIG. 5, the signal receiving equipment 10 according to the present embodiment includes a parameter acquisition unit 107. In addition, the signal receiving equipment 10 according to the present embodiment does not include a parameter setting unit 105 and a storage unit 106, unlike the first embodiment.

The parameter acquisition unit 107 acquires a first parameter corresponding to a positioning result obtained by the code-based positioning unit 103 among the first parameters stored in a parameter database (DB) 201 included in the server apparatus 20 through a communication network N. Similarly, the parameter acquisition unit 107 acquires a second parameter corresponding to a positioning result obtained by the code-based positioning unit 103 among the second parameters stored in the parameter DB 201 included in the server apparatus 20 through the communication network N.

Here, in the parameter DB 201 included in the server apparatus 20, for example, an optimal first parameter and an optimal second parameter which are set in advance are stored for each range of coordinate values. For example, as described above, an optimal value of an allowable error varies depending on whether a reception environment is close to an open sky environment or is close to a multipath environment. Consequently, after an optimal allowable error is determined in advance for each reception environment represented by the range of coordinate values, a parameter including the allowable error is stored in the parameter DB 201 in association with the range of the coordinate values. Thereby, the optimal first parameter and the optimal second parameter are stored in the parameter DB 201 for each range of coordinate values.

Note that, for example, in a case where a positioning result obtained by the code-based positioning unit 103 is received from the signal receiving equipment 10, the server apparatus 20 searches for a parameter (the first parameter or the second parameter) corresponding to the coordinates indicated by the positioning result from the parameter DB 201 and returns the parameter obtained from the searching to the signal receiving equipment 10.

Hardware Configuration

Figure 6:
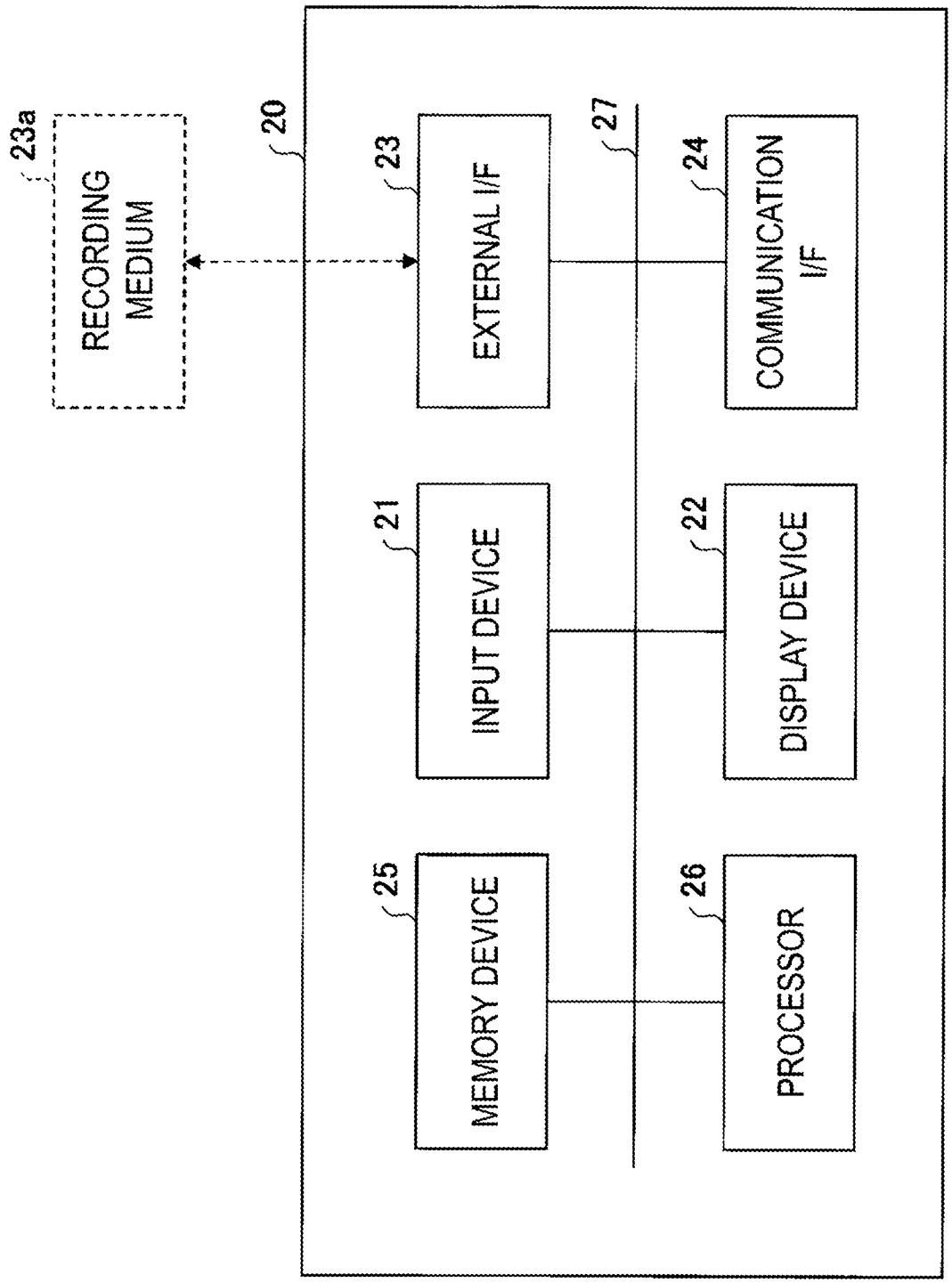
FIG. 6 is a diagram illustrating an example of a hardware configuration of a server apparatus according to the second embodiment.

Next, a hardware configuration of the server apparatus 20 according to the present embodiment will be described with reference to FIG. 6. FIG. 6 is a diagram illustrating an example of the hardware configuration of the server apparatus 20 according to the second embodiment.

As illustrated in FIG. 6, the server apparatus 20 according to the present embodiment includes an input device 21, a display device 22, an external I/F 23, a communication I/F 24, a memory device 25, and a processor 26. These pieces of hardware are communicatively connected to each other via a bus 27.

The input device 21 is, for example, a keyboard, a mouse, a touch panel, various operation buttons, or the like. The display device 22 is, for example, a display or the like. Note that the server apparatus 20 may not include at least one of the input device 21 and the display device 22.

The external I/F 23 is an interface for connection to an external device such as a recording medium 23a. Examples of the recording medium 23a include a CD, a DVD, an SD memory card, a USB memory, and the like.

The communication I/F 24 is an interface for connecting the server apparatus 20 to the communication network N. The memory device 25 is any of various storage devices such as a RAM, a ROM, a flash memory, a hard disk drive (HDD), and a solid state drive (SSD). The processor 26 is any of various computation devices such as a CPU. The parameter DB 201 can be implemented using, for example, the memory device 25.

The server apparatus 20 according to the present embodiment has the hardware configuration illustrated in FIG. 6, and thus can manage a plurality of first parameters and a plurality of second parameters. Note that the hardware configuration illustrated in FIG. 6 is an example, and the server apparatus 20 according to the present embodiment may have any of other hardware configurations. For example, the server apparatus 20 according to the present embodiment may include a plurality of memory devices 25, or may include a plurality of processors 26. In addition, some hardware configurations may also be connected to each other via a communication network.

Flow of Processing

Figure 7:
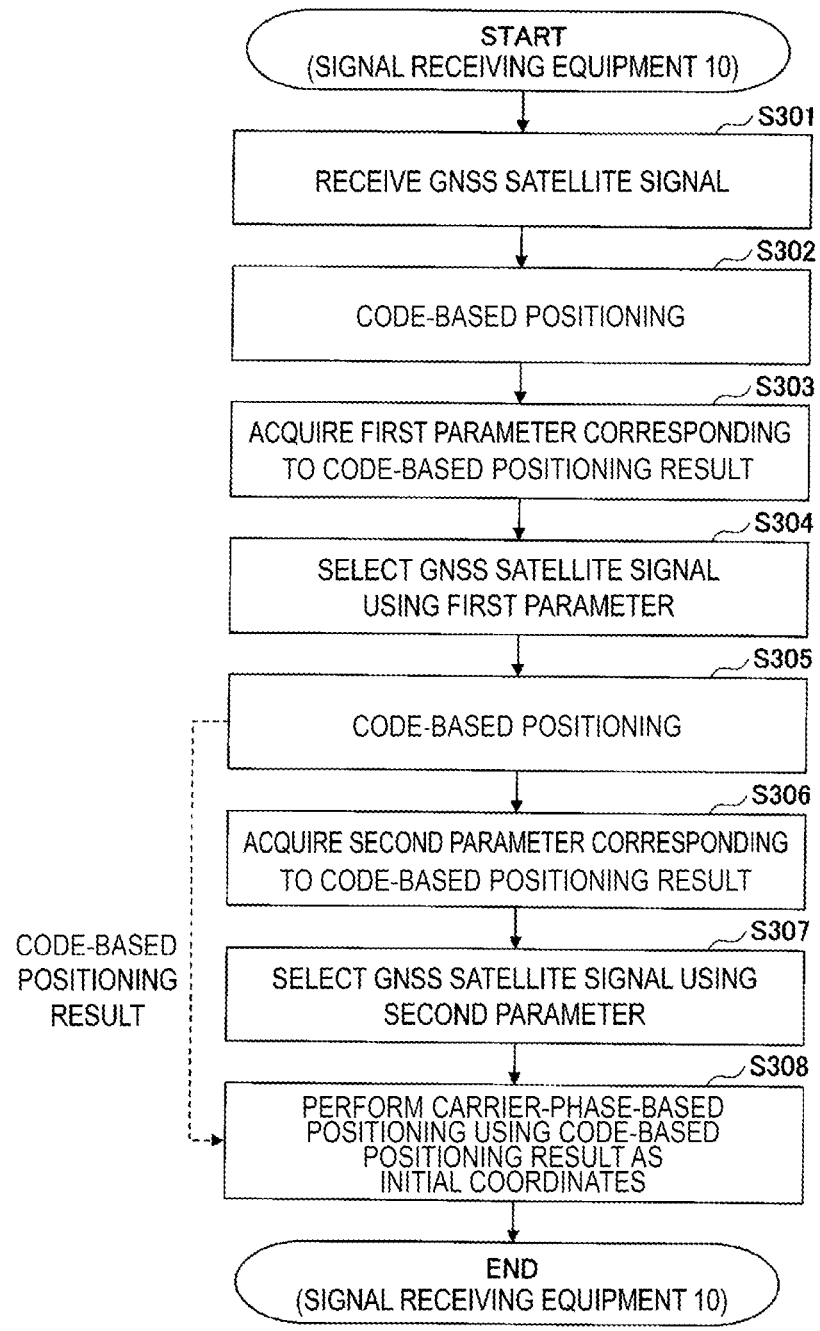
FIG. 7 is a diagram illustrating a flow of an example of positioning and time synchronization processing according to the second embodiment.

Hereinafter, positioning and time synchronization processing according to the present embodiment will be described with reference to FIG. 7. FIG. 7 is a diagram illustrating an example of a flow of positioning and time synchronization processing according to the second embodiment.

A GNSS reception unit 101 of the signal receiving equipment 10 receives GNSS satellite signals from at least four GNSS satellites at predetermined time intervals (for example, every second) (step S301). Hereinafter, let N be the number of GNSS satellite signals received by the GNSS reception unit 101.

Next, the code-based positioning unit 103 of the signal receiving equipment 10 performs code-based positioning using the N GNSS satellite signals received in step S301 described above (step S302). A positioning result of the code-based positioning is output to the parameter acquisition unit 107.

Next, the parameter acquisition unit 107 of the signal receiving equipment 10 acquires a first parameter corresponding to the positioning result in step S302 described above from among the first parameters stored in the parameter DB 201 included in the server apparatus 20 via the communication network N (step S303). Thereby, an optimal first parameter corresponding to the positioning result in step S302 described above (that is, coordinates measured by code-based positioning) is acquired.

Next, similarly to step S102 in FIG. 3, the signal receiving equipment 10 selects GNSS satellite signals to be used for code-based positioning for obtaining initial coordinates used for carrier-phase-based positioning from among the N GNSS satellite signals received in step S301 described above by using the first parameter acquired in step S303 described above (step S304).

Next, the code-based positioning unit 103 of the signal receiving equipment 10 performs code-based positioning using the GNSS satellite signals selected in step S304 described above (step S305). A positioning result of the code-based positioning is output to the carrier-phase-based positioning unit 104 and the parameter acquisition unit 107.

Next, the parameter acquisition unit 107 of the signal receiving equipment 10 acquires a second parameter corresponding to the positioning result in step S305 described above from among the second parameters stored in the parameter DB 201 included in the server apparatus 20 via the communication network N (step S306). Thereby, an optimal second parameter corresponding to the positioning result in step S305 described above (that is, coordinates measured by code-based positioning) is acquired.

Next, similarly to step S104 in FIG. 3, the signal receiving equipment 10 selects GNSS satellite signals to be used for carrier-phase-based positioning from among the N GNSS satellite signals received in step S301 described above by using the second parameter acquired in step S306 described above (step S307).

Then, the carrier-phase-based positioning unit 104 of the signal receiving equipment 10 performs carrier-phase-based positioning using the GNSS satellite signals selected in step S307 described above with the positioning result which is output from the code-based positioning unit 103 in step S305 described above as initial coordinates (step S308). Thereby, positioning of positional information and time synchronization are performed.

Summary

As described above, the signal receiving equipment 10 according to the first and second embodiments selects GNSS satellite signals each having a CN ratio that exceeds a threshold value, and performs positioning of reference coordinates by code-based positioning using the GNSS satellite signals, and then repeats the selection of GNSS satellite signals based on an arrival time at which each of the GNSS satellite signals reaches the reference coordinates and the updating of the reference coordinates by code-based positioning using the selected GNSS satellite signals. Thereby, the signal receiving equipment 10 according to the present embodiments selects GNSS satellite signals to be used for code-based positioning for performing positioning of initial coordinates and GNSS satellite signals to be used for carrier-phase-based positioning. Then, the signal receiving equipment 10 according to the present embodiments performs the positioning of initial coordinates by code-based positioning using the selected GNSS satellite signals, and then performs positioning and time synchronization by carrier-phase-based positioning using the initial coordinates and the selected GNSS satellite signals.

In addition, the signal receiving equipment 10 according to the first and second embodiments can select GNSS satellite signals using different parameters for a case where GNSS satellite signals to be used for code-based positioning for performing positioning of initial coordinates is selected, and for a case where GNSS satellite signals to be used for carrier-phase-based positioning is selected. In particular, the signal receiving equipment 10 according to the second embodiment can select a more appropriate GNSS satellite signals by acquiring an optimal parameter from the server apparatus 20 in accordance with a reception environment.

For this reason, in the signal receiving equipment 10 according to the first and second embodiments, positioning and time synchronization can be performed with high accuracy.

In the above-described embodiments, positioning processing is repeatedly performed at predetermined time intervals (cycles). However, it is also possible that positioning is performed based on the above-described procedure until a convergence (fix) solution of carrier-phase-based positioning is obtained, and after the convergence (fix) solution is once obtained, positioning computation is performed using a convergence (fix) solution at the immediately previous positioning time (time epoch) as reference coordinates of selection processing for GNSS satellite signals to be used in carrier-phase-based positioning and initial coordinates of carrier phase moving positioning. Hereinafter, the present operation will be described in detail regarding the first embodiment. In initial positioning, such as when the GNSS receiving device 17 is turned on, the processing illustrated in FIG. 3 is repeatedly performed at predetermined time intervals (cycles). However, after a convergence (fix) solution is once obtained, steps S102 and S103 are omitted, and the selection of a satellite is performed in step S104 by one-time processing in which a convergence (fix) solution at the immediately previous positioning time (time epoch) is set to be second reference coordinates. Next, in the subsequent step S105, carrier-phase-based positioning computation in which the convergence (fix) solution at the immediately previous positioning time (time epoch) is set to be initial coordinates is performed using the GNSS satellite signals selected in step S104. A convergence (fix) solution at the immediately previous time epoch is expected to be close to true values of coordinates in the time epoch in positioning performed in a stationary state or at the time of low-speed movement (at the time of walking, or the like), and thus it is possible to expect an improvement in the accuracy of satellite selection by using the coordinates as reference coordinates of satellite selection. Furthermore, initial coordinates of carrier-phase-based positioning are close to true values, and thus it is possible to expect an effect of improving a convergence (fix) ratio and continuously maintaining a stable convergence state. In addition, positioning processing can be drastically simplified, and thus it is possible to expect an effect of reducing a processing load. Note that the frequency of satellite selection may be reduced to once for several times of time epochs. Further, in a case where a fixed number of consecutive convergence (fix) solutions are not obtained, the processing may return to the processing illustrated in FIG. 3. The same applies to other embodiments. A similar effect is expected by appropriately reducing a time interval (cycle) of positioning in accordance with a moving speed also during high-speed movement, that is, appropriately improving the frequency of positioning.

Further, in a composite positioning system in which a relative positioning means such as an inertial measurement unit (IMU) or visual simultaneous localization and mapping (SLAM) is combined with absolute positioning performed by a GNSS, positions obtained not by composite positioning instead of positioning using a single GNSS may be set as reference coordinates of satellite selection. In an urban canyon reception environment in which a large number of structures are present in the vicinity of a reception position of GNSS satellite signals in urban areas, the accuracy of GNSS positioning deteriorates due to the limitation of an open space and the reception of a multipath signal due to surrounding structures. However, it is possible to improve the accuracy of reference coordinates by applying composite positioning and improve the accuracy of satellite selection.

This application is based on PCT/JP2019/036796, filed on Sep. 19, 2019 in Japan, the entire contents of which are incorporated herein by reference.

The present invention is not limited to the above-described embodiments disclosed specifically, and various modifications, alterations, combinations, and the like can be made without departing from the scope of the claims.

REFERENCE SIGNS LIST

10 Signal receiving equipment
11 Input device
12 Display device
13 External I/F
13a Recording medium
14 Communication I/F
15 Memory device
16 Processor
17 GNSS receiving device
18 Bus
19 GNSS antenna
101 GNSS reception unit
102 Selection unit
103 Code-based positioning unit
104 Carrier-phase-based positioning unit
105 Parameter setting unit
106 Storage unit

The invention claimed is:

1. A signal receiving equipment comprising:
a receiver configured to receive signals from a GNSS satellite, a memory, and a processor configured to
select a plurality of signals from among the signals received by the receiver using a preset first parameter;
perform at least positioning of a location by code-based positioning using the plurality of signals selected using the first parameter;
select a plurality of signals from among the signals received by the receiver using a preset second parameter; and
perform positioning of a location and time synchronization by carrier-phase-based positioning using the plurality of signals selected using the second parameter, with coordinates indicated by the location positioned by the code-based positioning as initial coordinates,
wherein the processor is configured to execute the selection of the plurality of signals using the first parameter and the selection of the plurality of signals using the second parameter in parallel.

2. The signal receiving equipment according to claim 1, wherein the signal receiving equipment is connected to a server apparatus including a database via a communication network, the database storing a range of coordinate values, an optimal value for the first parameter corresponding to the range is set, and an optimal value for the second parameter corresponding to the range is set in association with each other,
wherein the processor is further configured to perform at least positioning of a location by code-based positioning using the signals received by the receiver, and acquire the first parameter corresponding to coordinates indicated by the positioned location from the database in accordance with the coordinates, and wherein the processor selects the plurality of signals from among the signals received by the receiver by using the acquired first parameter.

3. The signal receiving equipment according to claim 2, wherein the processor is configured to acquire a value for the second parameter corresponding to coordinates indicated by the location positioned by the code-based positioning from the database in accordance with the coordinates, and select a plurality of signals from among the signals received by the receiver by using the second parameter.

4. The signal receiving equipment according to claim 1, wherein, denoting the number of the signals received by the receiver by N, the processor is configured to calculate arrival times at which N signals reach first reference coordinates, and then, select the plurality of signals by one of:

repeating selection of a signal having an arrival time earlier than a first reference time determined from an earliest arrival time among the N arrival times and a first allowable error included in the first parameter and updating of the first reference coordinates;

calculating an average value of the arrival times for each of combinations of M (where N>M) signals from among the N signals, and repeating selection of a signal having an arrival time earlier than the first reference time determined from an earliest average value among $_NC_M$ average values and a second allowable error included in the first parameter and updating of the first reference coordinates, wherein $_NC_M$ is a combination formula of N choose M; and calculating an average value of the arrival times for said each of combinations of the M signals from among the N signals, and repeating selection of a signal included in a combination having an average value of arrival times being earlier than the first reference time determined from the earliest average value among $_NC_M$ average values and a third allowable error included in the first parameter and updating of the first reference coordinates.

5. The signal receiving equipment according to claim 1, wherein, denoting the number of the signals received by the receiver by N, the processor is configured to calculate arrival times at which N signals reach first reference coordinates, and then, select the plurality of signals by one of:

repeating selection of a signal having an arrival time earlier than a second reference time determined from an earliest arrival time among the N arrival times and a fourth allowable error included in the second parameter and updating of the second reference coordinates;

calculating an average value of the arrival times for each of combinations of M (where N>M) signals from among the N signals and repeating selection of a signal having an arrival time earlier than the second reference time determined from an earliest average value among $_NC_M$ average values and a fifth allowable error included in the second parameter and updating of the second reference coordinates; and calculating an average value of the arrival times for said each of combinations of the M signals from among the N signals and repeating selection of a signal included in a combination having an average value of arrival times being earlier than the second reference time determined from the earliest average value among $_NC_M$ average values and a sixth allowable error included in the second parameter and updating of the second reference coordinates.

6. The signal receiving equipment according to claim 1, wherein the processor is configured to repeatedly perform reception of signals by the receiver at predetermined time intervals, selection of a plurality of signals using the first parameter, positioning of a location by the code-based positioning, selection of a plurality of signals using the second parameter, and positioning of a location and time synchronization by the carrier-phase-based positioning, wherein in a case where positioning of the location is performed by the carrier-phase-based positioning in a previous repetition, without performing the selection of the plurality of signals using the first parameter and the positioning of the location by the code-based positioning, the processor performs reception of signals by the receiver, selection of a plurality of signals using the second parameter, and positioning of a location and time synchronization by the carrier-phase-based positioning, select the plurality of signals using the location positioned by the carrier-phase-based positioning in the previous repetition and the second parameter, and perform positioning of a location and time synchronization by carrier-phase-based positioning using the plurality of signals selected using the second parameter with the location positioned by the carrier-phase-based positioning in the previous repetition as initial coordinates.

7. The signal receiving equipment according to claim 6, wherein, denoting the number of the signals received by the receiver by N, the processor is configured to calculate arrival times at which N signals reach coordinates indicating the location positioned by the carrier-phase-based positioning in the previous repetition, and then, select the plurality of signals by one of:

selecting a signal having an arrival time earlier than a reference time determined from an earliest arrival time among the N arrival times and an allowable error included in the second parameter;

calculating an average value of the arrival times for each of combinations of M (where N>M) signals from among the N signals and selecting a signal having an arrival time earlier than the reference time determined from an earliest average value among $_NC_M$ average values and the allowable error included in the second parameter; and calculating an average value of the arrival times for said each of combinations of the M signals from among the N signals and selecting a signal included in a combination having an average value of arrival times being earlier than the reference time determined from the earliest average value among $_NC_M$ average values and the allowable error included in the second parameter.

8. The signal receiving equipment according to claim 7, wherein the processor is further configured to position a location by an inertial measurement unit (IMU) or a visual simultaneous localization and mapping (SLAM), and wherein the processor is configured to calculate an arrival time at which a signal reaches coordinates indicating a location which is a combination of the location positioned by the carrier-phase-based positioning in the previous repetition and the location positioned by the IMU or SLAM.

9. A non-transitory computer-readable recording medium having computer-readable instructions stored thereon, which when executed, cause a computer including a receiver, a memory and a processor to execute processing as in the signal receiving equipment according to claim 1.

10. A signal processing method executed by a computer including a receiver, a memory, and a processor, the method comprising:

receiving signals from a GNSS satellite by the receiver;

selecting a plurality of signals from among the signals received in the receiving of signals using a preset first parameter;

performing at least positioning of a location by code-based positioning using the plurality of signals selected using the first parameter;

selecting a plurality of signals from among the signals received in the receiving of signals using a preset second parameter;

performing positioning of a location and time synchronization by carrier-phase-based positioning using the plurality of signals selected using the second parameter, with coordinates indicated by the position positioned by the code-based positioning; and performing selecting the plurality of signals using the first parameter and selecting the plurality of signals using the second parameter in parallel.

* * * * *